Dec. 9, 1952            E. J. ABBE            2,620,936
PALLET STRIPPING DEVICE FOR INDUSTRIAL TRUCKS
Filed Dec. 7, 1948                                            7 Sheets-Sheet 3
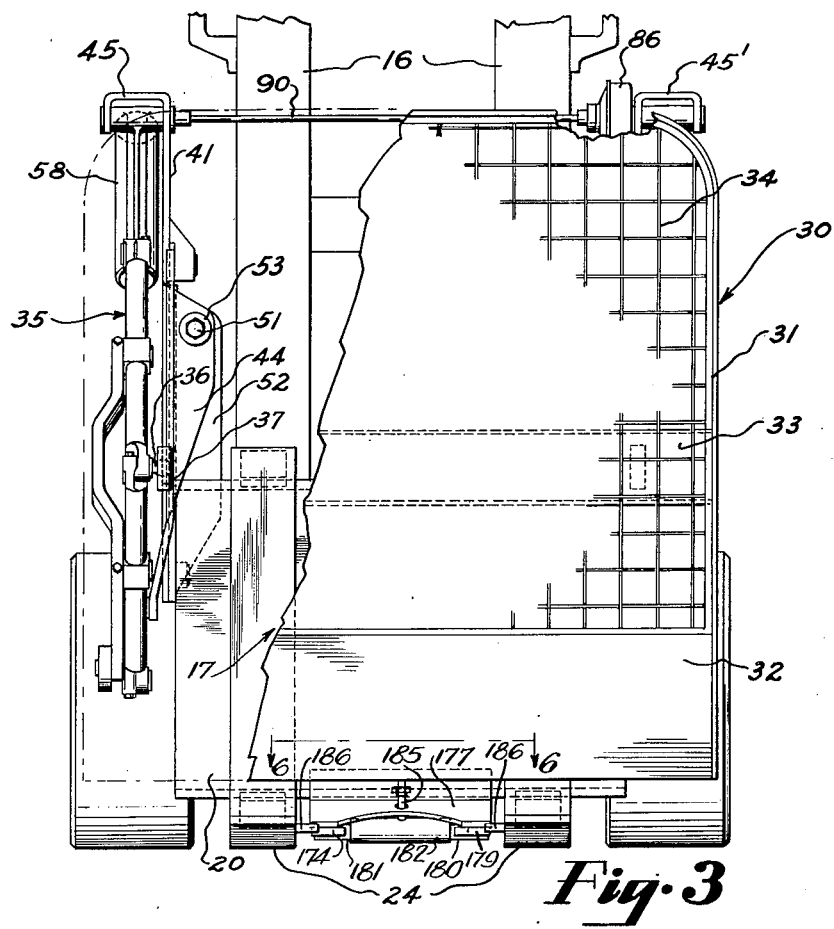
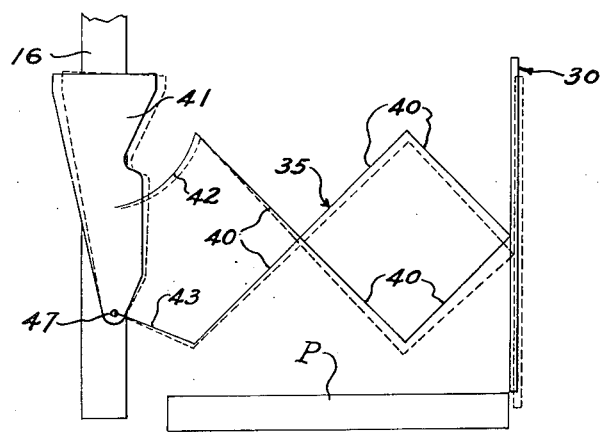
INVENTOR.
EDWARD J. ABBE
BY *Fay, Golrick & Fay*
ATTORNEYS Dec. 9, 1952 E. J. ABBE 2,620,936
PALLET STRIPPING DEVICE FOR INDUSTRIAL TRUCKS
Filed Dec. 7, 1948 7 Sheets-Sheet 4

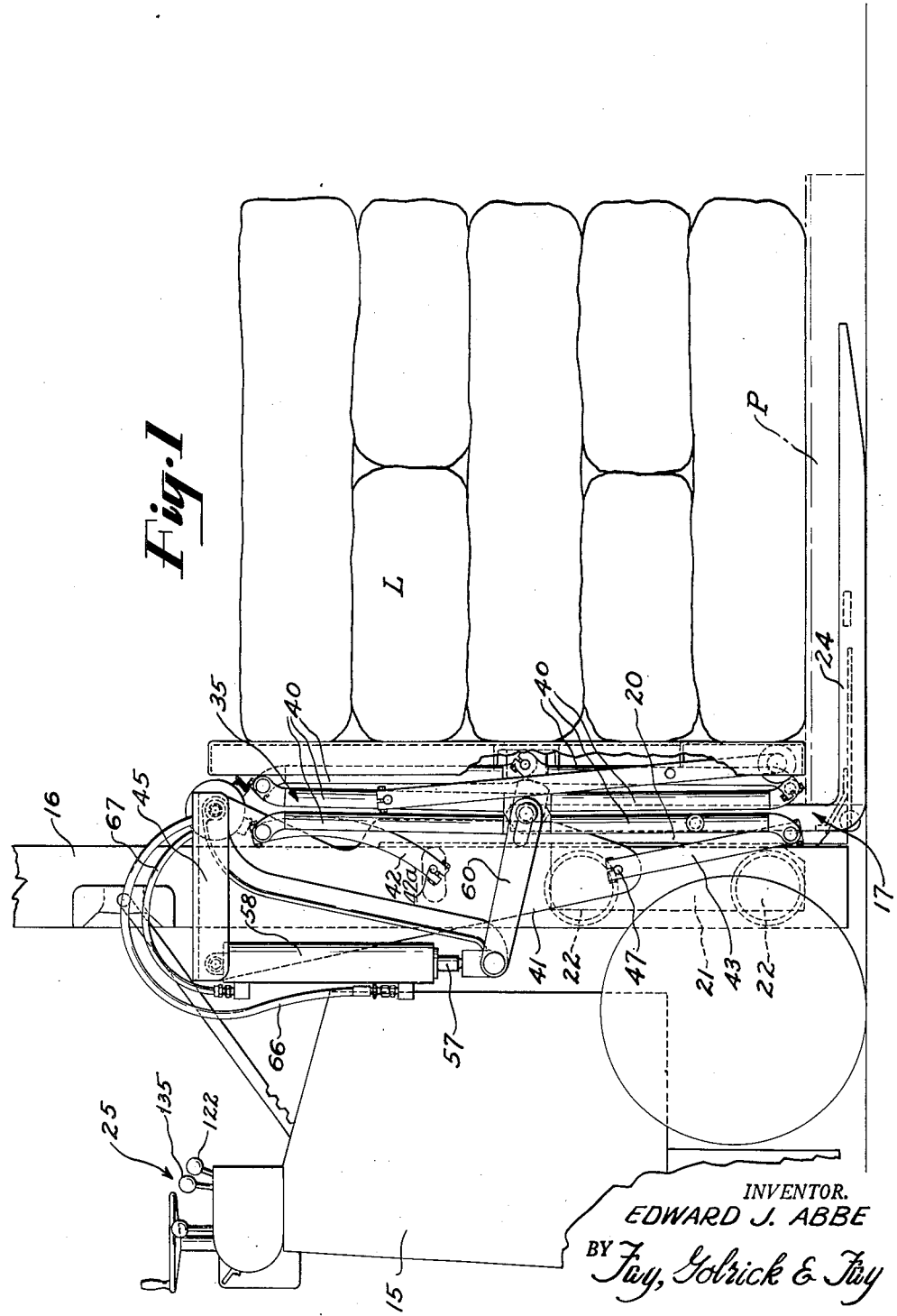

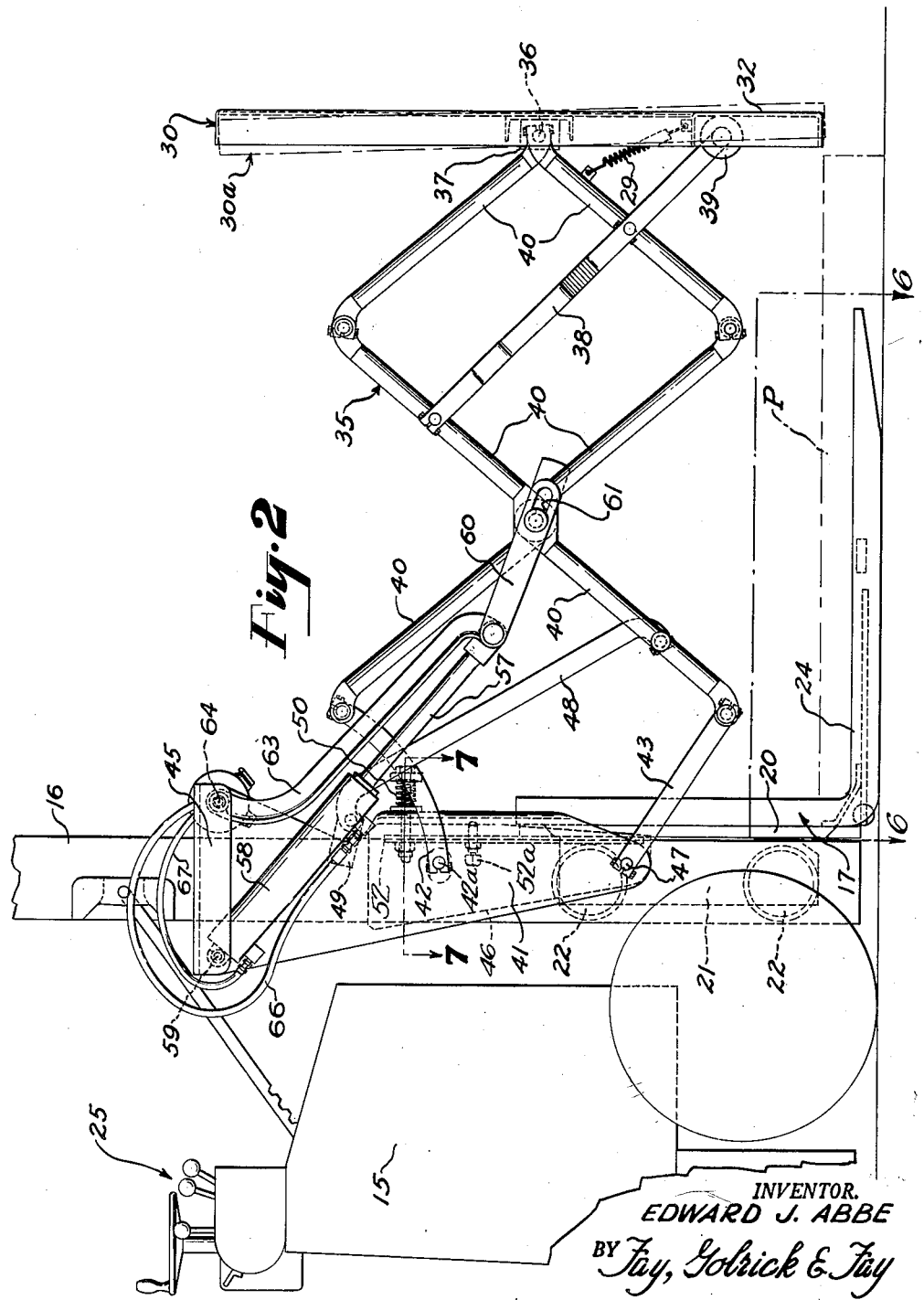

INVENTOR.
EDWARD J. ABBE
BY Fay, Golrick & Fay
ATTORNEYS

Dec. 9, 1952              E. J. ABBE              2,620,936
PALLET STRIPPING DEVICE FOR INDUSTRIAL TRUCKS
Filed Dec. 7, 1948                                        7 Sheets-Sheet 5
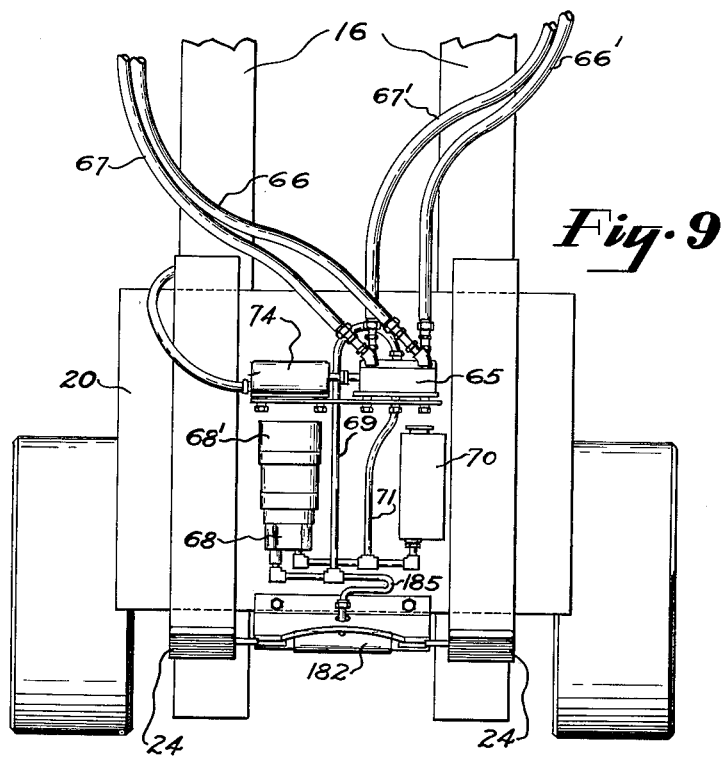
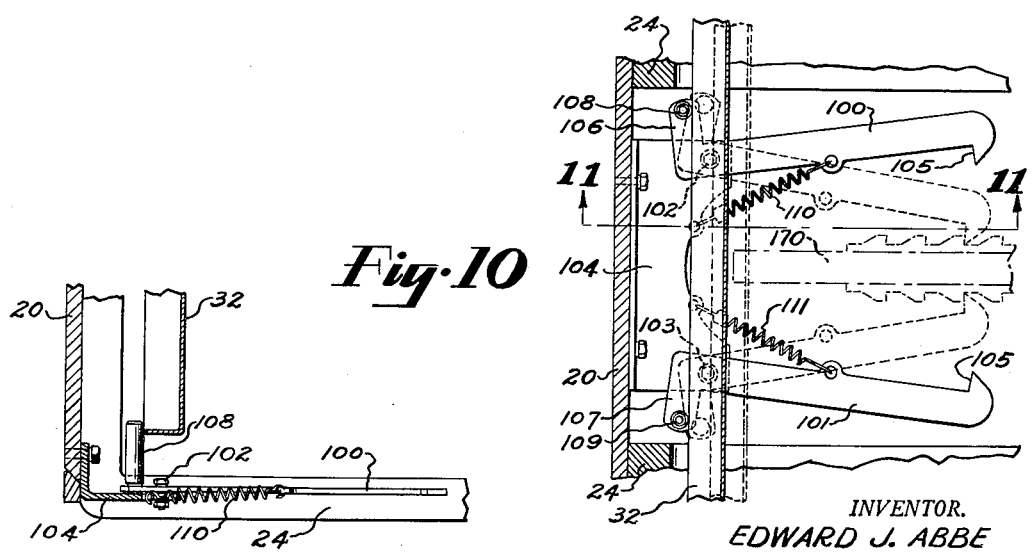
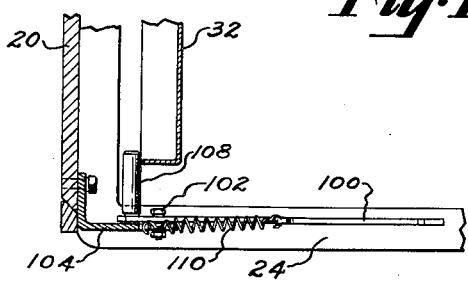
INVENTOR.
EDWARD J. ABBE
BY Fay, Gobrick & Fay
ATTORNEYS Dec. 9, 1952          E. J. ABBE          2,620,936
PALLET STRIPPING DEVICE FOR INDUSTRIAL TRUCKS
Filed Dec. 7, 1948          7 Sheets-Sheet 6
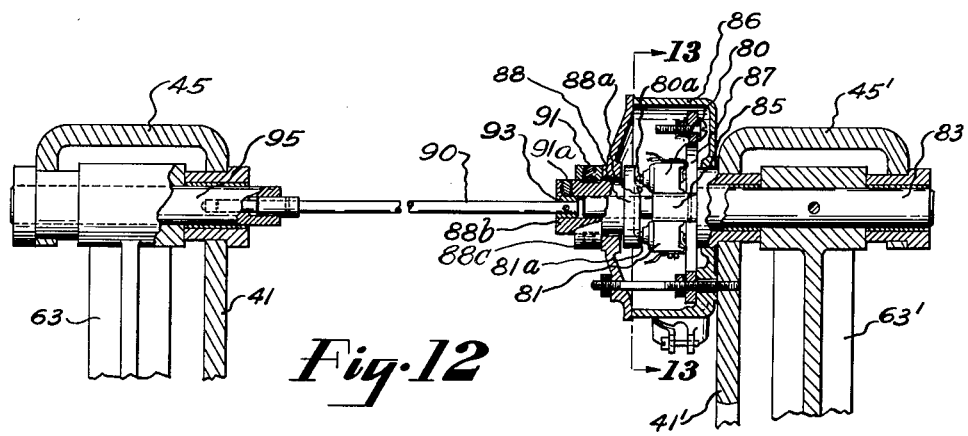
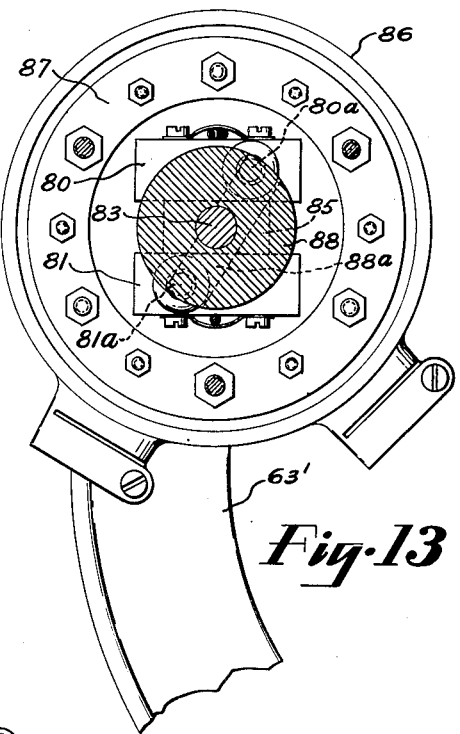
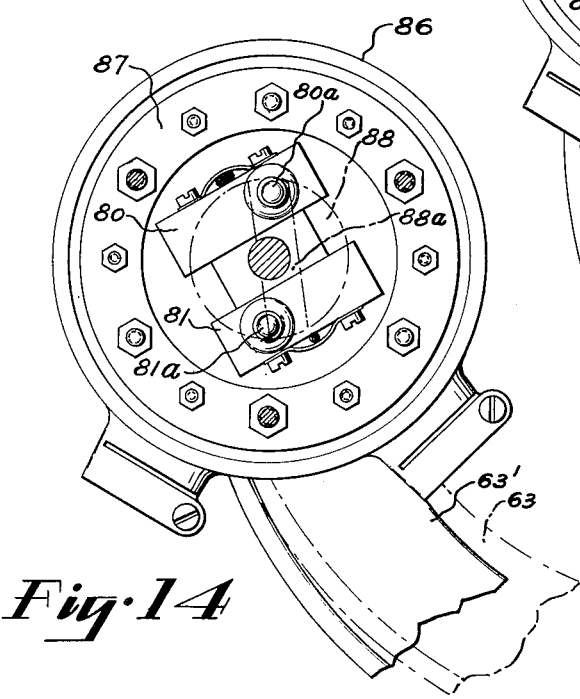
INVENTOR.
EDWARD J. ABBE
BY Fay, Golrick & Fay
ATTORNEYS INVENTOR.
EDWARD J. ABBE
BY Fay, Golrick & Fay
ATTORNEYS Patented Dec. 9, 1952

2,620,936

UNITED STATES PATENT OFFICE 2,620,936

PALLET STRIPPING DEVICE FOR INDUSTRIAL TRUCKS

Edward J. Abbe, Cleveland Heights, Ohio, assignor to The Elwell-Parker Electric Company, Cleveland, Ohio, a corporation of Ohio Application December 7, 1948, Serial No. 63,985

11 Claims. (Cl. 214—514)

The present invention relates to an industrial truck of the type having a load elevating fork at one end for insertion beneath a pallet bearing a load for transporting the load to a point of disposition where it is removed from the pallet by a stripper or push off device mounted on the truck.

An object of the present invention is to provide a pallet stripper for an industrial truck of the type referred to which stripper comprises a pusher member carried on the truck and having an upright planiform surface adapted to engage one side of the load and to be power operated to slide the load from the truck fork, the pusher member being mounted so that it has limited universal movement relative to the power mechanism whereby it may adjust itself to conform to the angle of the confronting surface of the load.

A further object of the invention is to mount the pusher member so that it is maintained in operative position immediately above the top level of the fork by resilient means so that the member can be displaced vertically below the fork surface level to follow the engaged load when the load drops from the pallet and to be returned to its operative position when disengaged from the load.

Still another object of the invention is to provide a locking device associated with the truck for engaging and locking the pallet on the fork of the truck when the pusher member is actuated so that the load may be slid off the pallet, the locking device and pusher member being controlled in synchronism.

A still further object of the invention is to provide a locking device for holding a pallet to the truck which will be operative although the elevator fork may not be precisely centered relative to the pallet when it is inserted beneath the latter.

Still another object of the invention is to provide a power mechanism for actuating the pusher member of the pallet stripper, which mechanism provides for moving one side of the pusher relative to the other, within a predetermined limit, which limit cannot be exceeded.

Other objects and advantages of the invention will be apparent from the following description of preferred forms of the invention, reference being made to the accompanying drawings wherein:

Fig. 1 is a side view of the forward part of an industrial truck with the forks inserted beneath a loaded pallet;

Fig. 2 is a view simiar to that of Fig. 1 but showing the push-off device in the extended position;

Fig. 3 is a front view of the truck, certain parts of which are broken away;

Fig. 4 is a diagrammatic view of the push-off device in the extended position;

Fig. 9 is a view in elevation of the truck with the push-off member removed to show certain parts of the operating mechanism;

Fig. 10 is a view similar to that of Fig. 6 but showing a second form of pallet locking mechanism;

Fig. 11 is a vertical sectional view of the second form of pallet locking mechanism taken on line 11—11 of Fig. 10;

Fig. 12 is a fragmentary view partly in section and partly broken away showing certain devices for limiting differential movement in the pallet stripping mechanism;

Fig. 13 is a view taken on line 13—13 of Fig. 12 but on a larger scale to show the structure of the differential motion limiting switch;

Fig. 14 is a view similar to that of Fig. 13, but showing certain parts in different positions;

Figure 6:
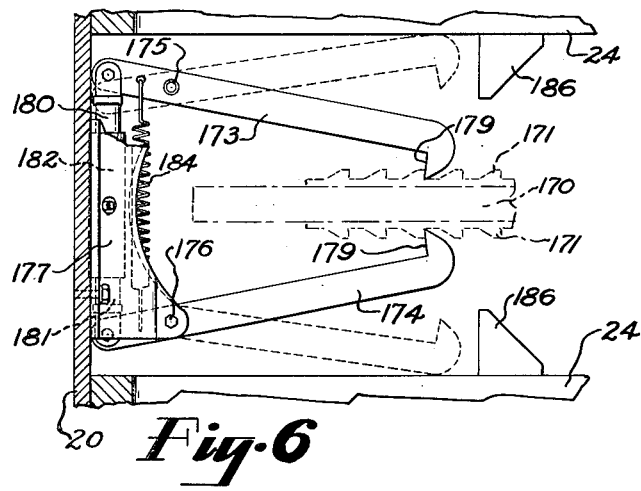
Fig. 6 is a top view of a pallet locking device, the view being taken on lines 6—6 of Figs. 2 and 3, but on a larger scale.
Figure 8:
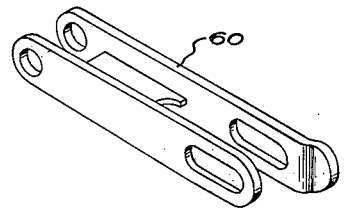
Fig. 8 is a perspective view of an operating link.
Figure 7:
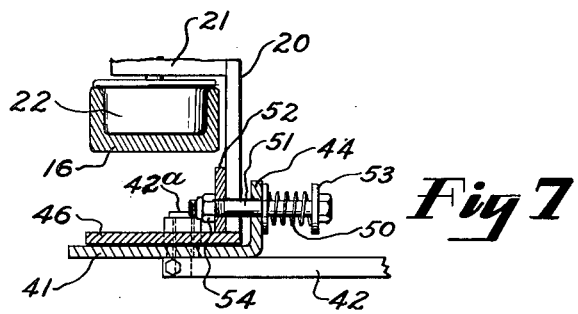
Fig. 7 is a fragmentary view taken on line 7—7 of Fig. 2 but on a larger scale.

The present invention is adapted to be utilized in connection with industrial trucks of the well known type having an elevator fork at one end which may be inserted beneath a loaded pallet and the load transported on the pallet to the disposal location as in a box car, for example. It is often desirable to remove the load from the pallet by sliding the entire load laterally off the pallet by a stripper or push-off device having a power actuated pusher member which is carried on the truck and operable to engage and push the load from the pallet. In pallet stripper devices heretofore employed, the load was apt to be damaged by application of the pusher member to a relatively small area of the load as where the confronting surfaces of the pusher and load were not in correspondence. Also, when the load dropped from the platform of the pallet it was frequently damaged by sliding downwardly while contacting the fixed pusher member. These disadvantages are overcome by my invention by providing a universal mounting for the pusher member relative to the power applying mechanism whereby the pusher member may accommodate itself to the engaged surface of the load and provide equal distribution of the pushing force over the face of the load. Also, the pusher member may move vertically with a resilient action so that it will follow the load dropping from the pallet and thereby eliminate relative movement between the engaging surfaces of the load and pusher member.

Referring now to the drawings, the forward portion of a conventional industrial truck 15 is shown, which truck includes a fork elevator mechanism at the forward end. The elevator mechanism shown includes a pair of upright channel members 16 which form a trackway for the fork structure 17 which is adapted to be elevated on the trackway in any suitable manner. The fork structure comprises a vertical plate 20 having two rearwardly extending flanges 21 (only one of which appears in the drawings) which project adjacent to the inside faces of the channel members 16, and wheels 22 are mounted on the flanges and ride in the channels of members 16. Two L-shaped tines 24 are attached to the plate 20 and extend forwardly in spaced relation to form a support for insertion beneath platform type pallets. The plate 20 is attached to a suitable power operated elevating mechanism which may be of any well known design and which is not shown, so that the fork structure can be raised and lowered at the will of the operator who controls operation of the truck from the station indicated generally at 25.

It will be readily understood by those familiar with this art that the fork may be inserted beneath a pallet, indicated at P, which pallet is adapted to support a load L such as stacked bags, for example, and the fork elevated to lift the pallet from the floor whereby the truck may then transport the load to its storage or disposal location.

The load is adapted to be removed from the pallet by a pusher member 30 which is operated by an hydraulic power system. The pusher member 30 comprises a rectangular frame 31 having a relatively deep, channel shaped bottom cross member 32 and an intermediate channel shaped cross piece 33. Heavy wire screen 34 is attached to the frame to provide a pushing surface which will not materially interfere with the vision of the operator. The pusher member is swivelly mounted on two parallel lazytongs 35 by ball joints 36 which are attached in sockets in blocks 37 forming parts of opposite ends of the cross member 33. (For the sake of clarity the parts of the mechanism on the side of the truck at the right in Fig. 3 which correspond to similar parts on the opposite side are referred to by similar reference numerals bearing primes.) This type of mounting permits the member 30 to tilt relative to vertical, as is indicated by the dotted lines 30ª in Fig. 2. Tilting of the member 30 clockwise is limited by a brace 38 pivotally connected to diagonally opposed lazytong members 40 and carrying a roller 39 which abuts cross member 32. A tension spring 29 resiliently urges the lower part of frame 30 against roller stop 39.

The lazytongs are each formed of six rod members 40 pivotally connected together in the manner shown in Fig. 2. Two converging rods 40 at the extensible end of each lazytong are connected to each of the ball joints 36, and at the opposite or operating ends of the lazytongs one diverging member 40 is connected to a support bracket 41 by a link 42 at pivot pin 42a and the other diverging member 40 is connected to the bracket 41 by a link 43 at pivot pin 47. Additional bracing is lent to the lazytongs by a brace member 48, one end of which is pivotally connected to bracket 41 by a bracket 49 and the other end of which is pivotally connected to the lower diverging lazytong member 40. It will be understood that both lazytongs are similar and are similarly mounted to the truck, as is described more fully hereinafter.

Each of the brackets 41 is formed of a plate having a laterally projecting front flange 44 and a downwardly facing channeled flange 45 at the top thereof, and is pivotally mounted at the bottom thereof by pivot pin 47 of link 43 to the plate 46 fixed to the plate 20 and extending rearwardly and also upwardly therefrom. Thus, the brackets 41 may rock about pins 47 which will permit the pusher member 30 to move vertically as is indicated by the dotted lines in Fig. 4. The brackets 41 are each normally urged to the position shown in Figs. 2 and 3 by a spring 50 which is mounted on a bolt 51 extending through openings in flange 44 of bracket 41 and in a vertical flange 52 which extends inwardly from plate 46 and is attached along its lower portion to plate 20. The spring is held on the bolt by a washer 53, and the bolt is retained in position by nut 54. The tension of springs 50 should be sufficient to hold the lazytongs in the elevated position, i. e., in position to hold pusher member 30 above the surface of pallet P when the lazytongs are extended as shown in Fig. 1, but, when the member 30 is in engagement with the load as the load drops from the pallet, the springs 50 permit the lazytong structure to tilt and lower the member 30 with the load, as indicated by the dotted lines in Fig. 4. Thus, there will be no abrasive or tearing action between the load and pusher member. After the pusher member is disengaged from the load it will be raised by the springs to permit retraction of the pusher. The normal elevation of the pusher member may be adjusted by a set screw 52a which is threaded in an opening through flange 52 and the outer end of which abuts flange 44 of bracket 41 to limit counterclockwise movement of the latter.

Figure 5:
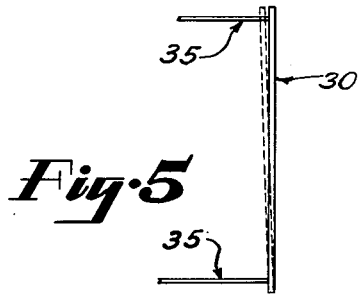
Fig. 5 is a diagrammatic top view of the push-off device.
Figure 15:
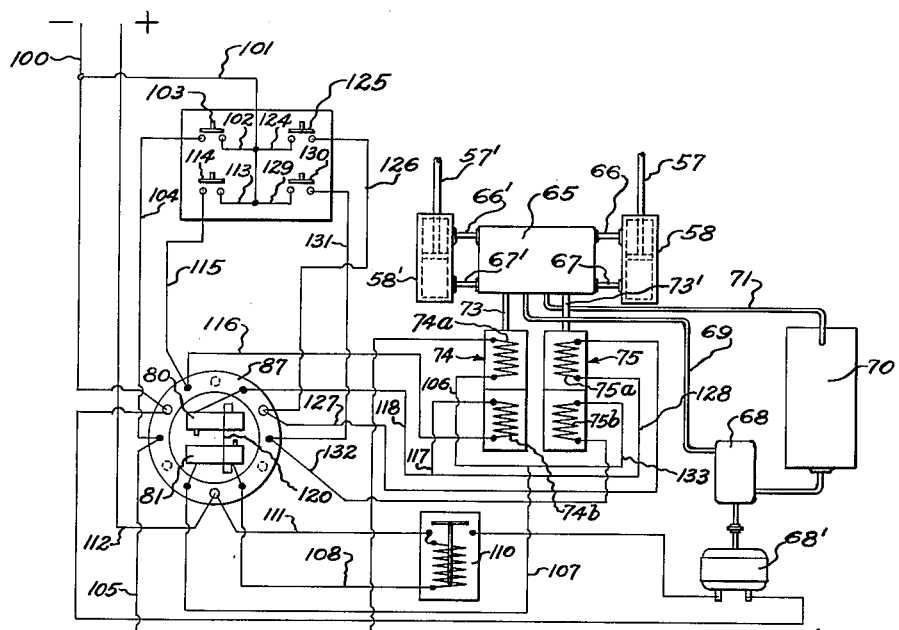
Fig. 15 is a schematic diagram of one form of electrical control system for the pallet stripping mechanism.

Each of the lazytongs is operated by an hydraulically operated piston mechanism. In Figs. 1–3 is shown in detail the lazytongs operating structure for one side of the truck, including piston 57 which is reciprocally mounted in a cylinder 58. The cylinder 58 is pivotally mounted at one end to the channel flange 45 of bracket 41 by a pin 59 so that the cylinders may swing in an arc. The outer end of piston 57 is pivotally connected to one end of a link 60 which is connected to the first joint of the associated lazytong by a slotted connection indicated at 61. Also, the outer end of the piston is pivotally connected with an arm 63 which is pivotally mounted on flange 45 of bracket 41 by pin 64 so that the force of piston 57 will act on link 60 substantially longitudinally of the lazytong movement. A second similar lazytongs operating structure is provided on the other side of the truck, the parts whereof that are similar to the first described structure are referred to by primed like numerals. In one form of the invention which is best illustrated in Fig. 15, the pistons 57, 57' may be individually controlled so that one side or the other of the pusher member may be moved relative to the other, but within a predetermined limit, as indicated schematically in Fig. 5 and as will be more fully explained hereinafter. For this purpose one end of each of the cylinders 58, 58' is connected with one set of ports of a reversible flow valve 65 by lines 66, 66' and the opposite ends of the cylinders are connected with the opposite set of ports of the valve by lines 67, 67', respectively. The valve is connected with the outlet of an electric motor driven hydraulic pump 68 by a line 69 and the exhaust from valve 65 is drained to a tank 70 by way of line 71. The valve consists of two individual sections, each section controlling the flow of fluid to one of the cylinders 57, 57', respectively. Each section of the valve is actuated by shanks 73 and 73' which are connected with the armatures of two way solenoids 74 and 75, respectively. The solenoids each have two magnetic windings $74^a$, $74^b$ and $75^a$ and $75^b$ for moving the armatures in one direction or the other according to which winding is energized. The armatures are normally urged by springs, not shown, to a neutral position in which the valves controlled by the respective solenoids are in the closed position. When winding $74^a$ is energized the valve 65 is actuated to cause fluid under pressure to enter the connected cylinder 58 through line 66 and to exhaust the cylinder through line 67. When winding $74^b$ is energized the valve is reversed to cause reverse movement of the piston. The other section of the valve 65 operates similarly when windings $75^a$ and $75^b$ are energized, respectively. The control circuits for the solenoids are arranged to prevent operation of one or the other of the cylinders in the event the pistons 57, 57' do not move approximately in correspondence, the appropriate cylinder being shut off to maintain a nearly uniform movement of the pistons. For this purpose the circuits include two switches 80 and 81 which are actuated in accordance with the relative movements of the pistons 57, 57'. Referring to Figs. 12 to 14 of the drawings, the arm 63' is pinned to a bearing shaft 83 which is journalled in suitable bushings in the bracket 41'. The shaft 83 has a bracket 85 attached to one end and the bracket supports the two switches 80 and 81 so that the switches are rotated angularly when the arm 63' is swung. The switches are the well known type having buttons $80^a$ and $81^a$, respectively, which when pressed inwardly relative to the switch cases cause the switches to open, the switches being normally in the closed position. The switches 80 and 81 are enclosed in a generally drum shaped housing 86 which is bolted to the bracket 41', and a terminal ring 87 is bolted to the interior of the housing. The switches are adapted to be actuated to the open position by a circular cam 88 having a riser surface $88^a$. The cam 88 is movable angularly on the same axis as the angular movement of the switches by a shaft 90 which is attached to the opposite arm 63. The cam 88 has a tubular stub $88^b$ which is axially positioned with respect to the casing by a collar $88^c$ held by set screw 91. One end of the shaft 90 extends into the stub $88^b$ and the shaft is secured in the stub by a set screw $91^a$, the shaft 90 having a collar 93 keyed thereto which is engaged by the set screw. The opposite end of the shaft 90 is suitably secured in a bore in a bearing shaft 95 which is journalled in bracket 41 and to which arm 63 is keyed. The cam 88 is positioned relative to the switch buttons as indicated in Fig. 13 when the arms 63, 63' are in correspondence in their swinging movement, i. e., when the pusher member is at right angles to the fork, or longitudinal axis of the truck. As long as the arms are in correspondence the switches 80, 81 will be open but when either arm moves angularly relative to the other, one or the other of the buttons $80^a$, $81^a$ will be engaged by the cam riser surface and cause the respective switch to open. This condition is illustrated in Fig. 14, in which arms are out of correspondence and switch 80 is closed. The control effected by the switches to maintain the arms 63, 63' in correspondence is described hereinafter.

The winding $74^a$ is controlled by a circuit which includes a line 100 leading to the negative pole of a battery carried by the truck, but not shown, lines 101, 102 to a switch 103, lines 104, 105 to one side of the winding, lines 106, 107, switch 81, line 108 to a magnetic contactor 110 and lines 111 and 112 to the positive pole of the battery. The contactor 110 is adapted, when energized to close the circuit to the motor 68' for operating pump 68. The circuit for winding $74^b$ includes lines 101, 113, switch 114, lines 115, 116, winding $74^b$, lines 117, 118, switch 80, line 120, switch 81, line 108, contactor 110 and lines 111 and 112. The switches 103 and 114 are preferably operated by a single lever 122 on the control panel, which when thrown forward closes switch 103 to cause outward movement of piston 57' and when drawn rearwardly closes switch 114 to cause retraction of the piston. The switches are normally open when the lever 122 is in neutral position.

The circuit of winding $75^a$ includes lines 101, 124, switch 125, lines 126, 127, winding $75^a$, lines 128, 118, switches 80, 81, line 108, contactor 110 and lines 111 and 112. The circuit for winding $75^b$ includes lines 101, 129, switch 130, lines 131, 132, winding $75^b$, lines 133, 107, switch 81, line 108, contactor 110 and lines 111 and 112. The switches 125 and 130 are operated by a control lever 135 to cause action of piston 57 by movements similar to that of lever 122. By this system when it is desirable to strip a load from the pallet on the fork structure both levers 122 and 135 are moved forward. If either arm 63 or 63' should exceed movement of the other due to unequal distribution of the load resistance, control lever for the leading arm may be moved to the neutral position until the movement of the arms is equal. Also, if both levers are held in the forward position and arm 63', for example, exceeds the movement of arm 63 a predetermined amount, the switches will be rotated relative to the cam surface $88^a$ which will open switch 81 and cause discontinuance of fluid pressure to piston 57' until the arms are in angular correspondence at which point switch 81 is again closed by removal from the cam surface. Likewise should arm 63 exceed movement of arm 63', the cam 88 will rotate relative to the switches causing opening of switch 80. A similar action occurs on the retraction movement of the arms 63, 63' so that it will be impossible for them to exceed a predetermined disparity in movement which might otherwise be detrimental to the stripper mechanism. The extent of disparity in movement will depend upon the differential in the switch opening and closing movements of buttons $80^a$ and $81^a$, and upon the pitch of cam surface $88^a$.

Figure 16:
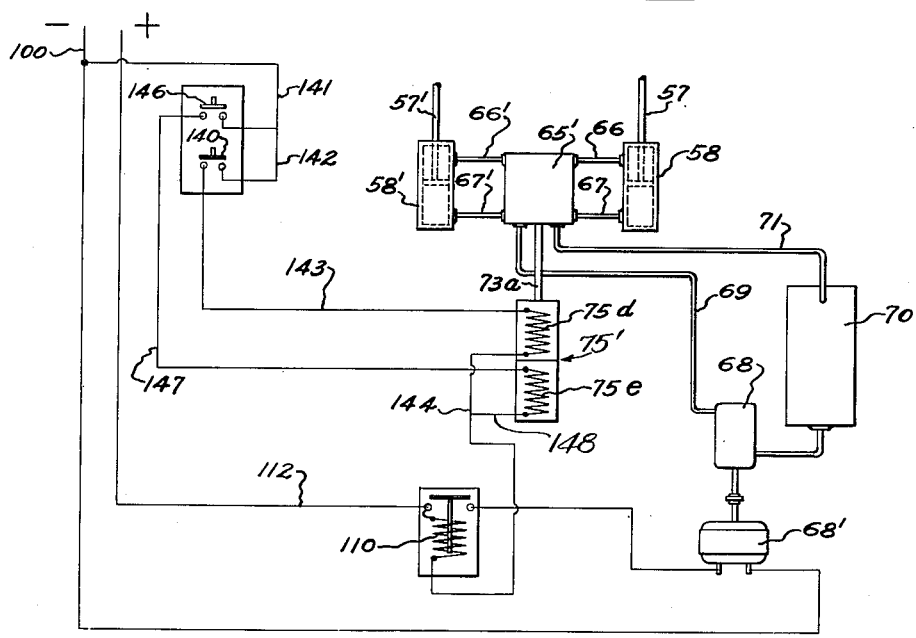
Fig. 16 is a schematic diagram of a second form of electrical control system.

In another form of the control system, shown in Fig. 16, a valve 65' having a single operating shaft $73^a$ is substituted for valve 65, and valve 65' is actuated by a solenoid 75 having windings $75^c$ and $75^d$ which influence an armature, not shown, one direction or the other, according to which winding is energized, to operate shaft $73^a$. When winding $75^d$ is energized the valve is actuated to direct fluid pressure through lines 66 to cylinders 57 and to exhaust fluid from the cylinders through lines 67 and this action is reversed when winding 75ᵉ is energized. When both windings are de-energized, the valve is closed. With this control system, the movement of the pusher member is controlled by a single lever, not shown, which is similar to levers 122 and 135. When the control lever is thrown forward it closes a switch 140 which completes a circuit to winding 75ᵈ from line 100 through lines 141, 142, 143, winding 75ᵈ, line 144, contactor 110 and line 112. Reverse movement of the pusher member is had by moving the control lever rearwardly which closes a switch 146 completing a circuit from line 100, through lines 141, 147, winding 75ᵉ, lines 148, 144, contactor 110 to line 112. If the arms 63 become excessively out of correspondence, the pistons 57 and 57' may be reversed to bring the pusher member to its rearmost position when it will be automatically properly aligned.

When the load is slidingly removed from the pallet, it is necessary for the pallet to be held to the truck against the friction of the load and toward this end the pallet is provided with a central, longitudinally extending rib 170 which projects downwardly from the platform of the pallet and a series of teeth 171 are formed on opposite sides of the rib and they extend laterally thereof. The teeth are beveled in on direction, the purpose of which will be apparent as the description proceeds.

A locking device is mounted on the lower central portion of the plate 20 and this device comprises a pair of arms 173 and 174 which are pivotally mounted at 175 and 176, respectively, between parallel webs of a U shaped bracket 177 secured at its yoke to plate 20. The outer ends of arms 173 and 174 are rounded and hook-like portions 179 are formed adjacent the ends. The inner ends of the arms 173 and 174 are connected to pistons 180 and 181, respectively, which pistons reciprocate in a cylinder 182 supported on bracket 177. A tension spring 184 is connected between the arms 173 and 174 for drawing the inner ends of the arms toward one another, as indicated by the dotted lines in Fig. 6. The central portion of cylinder 182 is connected by a conduit 185 (see Fig. 9) to pump 68 so that the pistons 180 and 181 will be moved outwardly to latch the pallet when the pump is operated for actuating the push off device. The latching is effected by the outer ends of arms 173 and 174 being swung inwardly to catch on teeth 171. It will be noted that although the teeth carrying ridge 170 of the pallet may not be accurately centered relative to the fork, the locking arms will engage the teeth with equal force by reason of the hydraulic action on pistons 180 and 181. Preferably, the tines 24 of the fork are provided with triangular shaped blocks 186 which project inwardly and which serve to more or less center the ridge 170 of the pallet as the fork is inserted beneath the pallet. This centering not only insures operation of the locking device in holding the pallet but it also provides clearance for release of the arms 173, 174 from the teeth 171. When pump 68 is stopped, fluid is exhausted from cylinder 182 by spring 184 as it moves the arms 123 and 124 to release teeth 171. Thus, the pallet lock is effective only during the operation of the pallet stripper.

Another form of locking mechanism is shown in Figs. 10 and 11 which comprises a pair of levers 100—101 pivotally mounted at 102 and 103 on a bracket 104 attached to plate 20. The levers 100—101 have hook formations 105 at the outer ends for engaging the teeth 171 of the pallet. The opposite ends of the levers have laterally projecting portions 106—107, respectively, carrying rollers 108 and 109 which project upwardly and are engaged by the cross member 32 of the pusher member when the latter is in the inoperative position adjacent plate 20. Springs 110 and 111 interconnect bracket 104 with levers 100—101, respectively, for urging the outer ends of the levers toward one another for engaging the teeth 171. When the pusher member 30 is against rollers 108 and 109 the outer ends of the levers are separated but as the stripper apparatus is operated, movement of pusher member from plate 20 permits springs 110—111 to draw the levers to the pallet locking position, as illustrated by the dotted lines in Fig. 10. The levers are moved to unlock the pallet by member 32 re-engaging the rollers 108—109 and rotating the levers as the pusher member approaches plate 20.

By my invention, I have provided a pallet stripping device which is compact, efficient and not apt to injure the load as it is stripped from the pallet. The locking mechanism for the pallet which interacts with the stripper operation permits normal usage of the fork in picking up and disposing of pallets and it is automatically operative when the stripper is actuated.

Although I have shown and described several forms of embodiments of the invention, it is to be understood that still other forms might be adopted, all falling within the scope of the claims which follow. I claim:

1. In combination, a power truck having a load carrying surface, and a mechanism for pushing the load laterally from the surface; said mechanism comprising, a pair of spaced lazytong structures each mounted at one end thereof to the truck on opposite sides of said surface, said lazytongs being adapted to extend parallel to one another and lengthwise of said surface when they are extended, an upright pusher member attached to the outer ends of the lazytongs, power mechanisms for extending and retracting each of said lazytongs, said power mechanisms being individually controlled to effect a limited differential motion between said tongs, and pivot means with horizontal pivot axis perpendicular to the plane of extension of each said lazytongs mounting said lazytongs to the truck for permitting the outer ends of the lazytongs to drop downwardly.

2. In combination, a power truck having a load carrying surface, and a mechanism for pushing the load laterally from the surface; said mechanism comprising, a pair of spaced lazytong structures each mounted at one end thereof to the truck on opposite sides of said surface, said lazytongs being adapted to extend parallel to one another and lengthwise of said surface when they are extended, an upright pusher member attached to the outer ends of the lazytongs, power mechanisms for extending and retracting each of said lazytongs, said power mechanisms being individually controlled to effect a limited differential motion between said tongs, pivot means mounting said lazytongs to the truck for permitting the outer ends of the lazytongs to tilt downwardly, and resilient means opposing tilting of the lazytongs downwardly.

3. In combination, a power truck having a load carrying surface, and a mechanism for pushing the load laterally from the surface; said mechanism comprising a pair of spaced lazytong structures each mounted at one end thereof to the truck on opposite sides of said surface, said lazytongs being adapted to extend parallel to one another and lengthwise of said platform when they are extended, an upright pusher member pivotally attached to the outer ends of the lazytongs, hydraulically operated means connected to each of said lazytongs for extending and retracting said lazytongs, said hydraulic means being individually controlled whereby said means may effect a limited differential motion between said lazytongs, pivot means mounting said lazytongs to the truck for permitting the extendable ends of the lazytongs to move downwardly, and resilient means opposing said downward movement, said resilient means being interposed between said lazytongs and said truck.

4. In combination, an industrial truck having an elevator structure at one end thereof and a fork adapted to be raised and lowered on said structure; a pallet stripping device mounted on the truck for stripping a load from a pallet on said fork, said device comprising a planiform vertically extending load engaging member and power means for moving said member across the fork; and a latching mechanism on the truck for engaging the pallet, said latching mechanism including a latch bar pivotally mounted to said elevator structure, biasing means normally biasing said bar to a pallet latching position, and means on the bar engageable by the pallet stripping device to move the said bar to unlatched position upon movement of the said device to fully retracted position whereby the said latching mechanism is responsive to the actuation of said load engaging member for latching the pallet when said member moves a load from the pallet and releasing the pallet when the said member is moved to its inoperative position.

5. In an industrial truck having an elevator platform, a pallet stripping device comprising an abutment movable transversely of the elevator platform for pushing a load transversely of the platform; a pair of abutment actuating units carried by the truck and connected to opposite sides of the abutment for moving the abutment transversely of the platform; manual control means for individually controlling each actuating unit for moving said abutment forwardly and rearwardly; and limiting means responsive to the relative movement by each of said units for rendering one of said units inoperative when the forward or rearward movement of the last mentioned unit exceeds beyond a certain degree the forward or rearward movement of the other of said units.

6. In an industrial truck having an elevator platform, an abutment movable transversely of the platform for stripping a load from the latter; a pair of pistons and cylinders carried by the truck and each connected to an opposite side of the abutment for moving the abutment transversely of the platform; an hydraulic system for moving said pistons in the respective cylinders, said system including an electromagnetic valve for each cylinder; electric control circuits for said valves including therein a pair of switches for controlling said valves, respectively, said switches each having an actuating element therefor shiftable in position according to movement of one of said pistons; and a switch actuating member shiftable in position according to movement of the other of said pistons and being aligned with said elements when the pistons are in substantial correspondence in position and movable out of alignment when the pistons are substantially out of correspondence in position.

7. In combination, an industrial truck having a load elevating structure at one end, comprising a fork for raising and lowering loaded pallets; a pusher mechanism associated with the elevator structure, comprising an upwardly extending planiform pusher member movable transversely of and above the fork for sliding a load from a pallet carried by the fork; an hydraulic power mechanism for actuating the pusher member; a latching device carried by the truck and adapted to engage the pallet on the fork for locking the pallet to the truck for sliding the load laterally off the pallet; and hydraulic power means for actuating the latching device, said hydraulic power means and power mechanism being hydraulically interconnected whereby the latch is actuated to engage the pallet prior to removal of the load by the pusher member.

8. In combination, a power truck having a load carrying surface and a mechanism for pushing the load laterally from the surface; said mechanism comprising a pair of spaced lazytong structures each mounted at one end thereof to the truck on opposite sides of said surface, said lazytongs being adapted to extend parallel to one another and lengthwise of said surface when they are extended, an upright pusher member attached to the outer ends of the lazytongs by means allowing limited universal movement, power mechanisms for extending and retracting each of said lazytongs, said power mechanisms being individually controlled to effect a limited differential motion between said lazytongs, and pivot means mounting said lazytongs to the truck for permitting the outer ends of the lazytongs to tilt downwardly.

9. In combination, a power truck having a load carrying surface and a mechanism for pushing the load laterally from the surface; said mechanism comprising a pair of spaced lazytong structures each mounted at one end thereof to the truck on opposite sides of said surface; said lazytongs being adapted to extend parallel to one another and lengthwise of said surface when they are extended, an upright pusher member attached to the outer ends of the lazytongs by means allowing limited universal movement, power mechanism for extending and retracting each of said lazytongs, said power mechanisms being individually controlled to effect a limited differential motion between said lazytongs, pivot means mounting said lazytongs to the truck for permitting the outer ends of the lazytongs to tilt downwardly, and resilient means interposed between said lazytongs and said truck opposing tilting of the lazytongs downwardly.

10. In combination, a power truck having a load carrying platform and a mechanism for pushing the load laterally from the platform; said mechanism comprising a pair of spaced bracket plates each pivotally mounted to the truck on opposite sides of the platform, each of said bracket plates pivotally mounting an arm and a pair of spaced link bars displaced vertically from each other, said arm having a third link bar pivoted thereto; a pair of hydraulic cylinder and piston mechanisms each having one end pivotally mounted to one of said bracket plates and the other end commonly pivoted to the said arm and said third link bar; an upright pusher member; and a pair of lazytong structures pivotally connected at the extendable ends thereof to said pusher member and adapted to extend parallel to one another and lengthwise of said platform, each of said lazytongs including a pair of main arms pivotally connected singly at the operating ends thereof to the said pair of link bars and pivotally connected at their mid-lengths to each other and to an end of said third link bar, one of the pivotal connections of said third link bar being a pin and slot type connection.

11. In combination, a power truck having a load carrying platform and a mechanism for pushing the load laterally from the platform; said mechanism comprising a pair of spaced bracket plates each pivotally mounted to the truck on opposite sides of the platform, each of said bracket plates pivotally mounting an arm and a pair of spaced link bars displaced vertically from each other, said arm having a third link bar pivoted thereto; a pair of hydraulic cylinder and piston mechanisms each having one end pivotally mounted to one of said bracket plates and the other end commonly pivoted to the said arm and said third link bar; an upright pusher member; a pair of lazytong structures pivotally connected at the extendable ends thereof to said pusher member and adapted to extend parallel to one another and lengthwise of said platform, each of said lazytongs including a pair of main arms pivotally connected singly at the operating ends thereof to the said pair of link bars and pivotally connected at their mid-lengths to each other and to an end of said third link bar, one of the pivotal connections of said third link bar being a pin and slot type connection; and a brace arm carried by each bracket plate, said brace arm extending from a pivotal connection on the bracket plate to a pivotal connection carried on one of said main arms of the lazytongs.

EDWARD J. ABBE.

REFERENCES CITED

The following references are of record in the file of this patent:

UNITED STATES PATENTS

| Number | Name | Date |
|---|---|---|
| 2,190,346 | Austin | Feb. 13, 1940 |
| 2,256,454 | Bomar | Sept. 16, 1941 |
| 2,331,790 | Nichols, Jr. | Oct. 12, 1943 |
| 2,371,661 | Wilms | Mar. 20, 1945 |
| 2,388,458 | Alfonte | Nov. 6, 1945 |
| 2,418,661 | Palm | Apr. 8, 1947 |

FOREIGN PATENTS

| Number | Country | Date |
|---|---|---|
| 474,968 | Germany | Apr. 17, 1929 |